United States Patent Office 3,449,068
Patented June 10, 1969

3,449,068
PROCESS FOR THE MANUFACTURE OF POLYPHOSPHATES
Gerhard Hartlapp, Hermulheim, near Cologne, and Werner Kowalski and Helmut Klee, Knapsack, near Cologne, Germany, assignors to Knapsack Aktiengesellschaft, Knapsack, near Cologne, Germany, a corporation of Germany
No Drawing. Filed Feb. 7, 1967, Ser. No. 614,417
Claims priority, application Germany, Feb. 9, 1966, K 58,367; July 16, 1966, K 59,798
Int. Cl. C01b 25/30, 25/28
U.S. Cl. 23—105    12 Claims

ABSTRACT OF THE DISCLOSURE

Process for the manufacture of polyphosphates, wherein an orthophosphate solution or suspension, sprayed inside a spray tower in the presence of a reducing substance, at a temperature of 200 to 500° C., is combined with a solution of an oxidant oxidizing the reducing substance and its decomposition products, contacted therewith for a period of less than 1 second, and the combined solutions are sprayed jointly. The polyphosphates so made are white and odorless.

---

The present invention relates to a process for the manufacture of polyphosphates, wherein an orthophosphate solution or suspension is sprayed inside a tower in the presence of a reducing agent, particularly low-valent phosphorus compounds in which the phosphorus has an electropositive valency of less than 5, at temperatures between 200 and 500° C.

These low-valent phosphorus compounds (phosphites, hypophosphites and similar compounds) formed during the production of polyphosphates originate, for example, from the fact that the starting solutions or suspensions are being sprayed inside towers that are heated by means of phosphorus-containing off-gases issuing during the electrothermal production of phosphorus, or from the fact that they are being added to the starting materials in an attempt to obtain final products of low bulk density.

These compounds are found, at a certain temperature, to liberate a gaseous decomposition product with the effect that on dehydrating the sprayed droplets these are being inflated to hollow salt ball structures.

The decomposition temperature of these low-valent phosphorus compounds is a factor of considerable importance for the production of polyphosphates of low bulk density. Firstly, the decomposition should not occur prematurely, i.e., in the aqueous phase, and secondly it should not be deferred until solid salt is found to have been formed. In this latter case, the hollow salt ball would be found to have been cracked and broken up into small fractions under the action of the decomposing substance.

The substance liberating gas should decompose at about 110° to 120° C. which is the optimum decomposition temperature for the manufacture of products of low bulk density. At that temperature, the sprayed droplets of the orthophosphate solutions are just viscous enough to be fully inflated.

The effect described above can be improved by spraying the orthophosphate solution together with a solution liberating $CO_2$, more particularly with a solution of a carbonate or bicarbonate of the alkali metals or of ammonium.

In this event, before leaving the spray nozzle, the two solutions are so combined that the resulting spray solution liberates the carbon dioxide under overpressure and that the transformation of the orthophosphates into polyphosphates occurs in the presence of $CO_2$. While the use of a solution liberating $CO_2$ enables the needed quantity of low-valent phosphorus compounds to be lowered by about 50%, it is impossible in this process completely to omit the low-valent phosphorus compounds.

Phosphites or hypophosphites, which are used in the form of their sodium salts, have proved to be addends useful for the manufacture of condensed phosphates of low bulk density, by the spray process. Various phosphite esters which are waste-products of organic syntheses have also proved suitable for this.

The condensed phosphates produced with the use of low-valent phosphorus compounds have, however, all been found to offer the disadvantage of including various decomposition products. When dissolved in water, these decomposition products, which are partially toxic, are found to have an unpleasant smell, or the products tested to determine their purity are found to include them as undesirable ingredients.

As mentioned above, a phosphorus-containing gas, e.g., reaction gas coming from an electrothermal phosphorus furnace, can be used for heating the spray towers inside which condensed phosphates are produced by the spray process. However, the phosphates obtained are found again to contain low-valent phosphorus compounds which impair their quality. Quality tests have proved this.

These tests comprise the simple olfactory test, in which a given quantity of salt is made with water into a paste and the smell of the resulting vapors is tested, and more particularly the lead acetate test. To this end, a sample of the product is boiled while adding pure phosphoric acid and the resulting vapors are passed through filter paper impregnated with a lead acetate solution. No more than very minor traces of low-valent phosphorus compounds are needed, which escape together with the steam, to produce a black spot on the lead acetate-impregnated paper. This very sensitive test method is an index of the purity of the product.

Low-valent phosphorus compounds, including their decomposition products retained in the salt, are known to be oxidizable by means of chlorates, nitrates, peroxides or similar compounds, the oxidation taking place in an aqueous solution at temperatures higher than 70° C. However, this is a phenomenon undesirable in the manufacture of polyphosphtaes of low bulk density with the use of low-valent phosphorus compounds, because these, which are needed for making light products, are oxidized prematurely and thus are rendered inactive.

It is also known that gases containing phosphorus can be treated with nitric acid, the phosphorus being oxidized to form $P_2O_5$. In the event that the spray tower is heated by means of a gas containing phosphorus, the phosphorus is found to undergo incomplete oxidation, which is disadvantageous. The phosphorus then produces low-valent compounds impairing the quality of the salt product that is being formed.

The addition of solid oxidizing agents to the finished product produces no effect.

Attempts have therefore been made to develop a process complying with the following requirements:

(1) In the production of light products, the oxidant should under no circumstances be allowed to oxidize, prior to the spraying, the low-valent phosphorus compounds which are needed for producing low bulk density.

(2) The oxidation inside the sprayed droplets of orthophosphate solution shall take place not earlier than after thermal decomposition of the low-valent phosphorus compounds.

(3) After thermal decomposition of the low-valent phosphorus compounds, at about 110 to 120° C., the remaining decomposition products are required to be completely oxidized and inactivated.

(4) Low-valent phosphorus compounds found to be contained in the polyphosphate, when phosphorus-containing gas is the heating gas for the spray tower, are also required to be oxidized.

The present invention now unexpectedly provides a process for making odorless products, wherein an orthophosphate solution or suspension is so combined with a solution of an oxidant oxidizing reducing substances and their decomposition products, more particularly residues and decomposition products of low-valent phosphorus, that the contact time of the orthophosphate solution or suspension with the solution of the oxidant is less than 1 second, preferably 0.1 to 0.3 second, and the combined solutions are thereafter sprayed jointly.

The orthophosphate solution or suspension, which is preferably used while hot, and the solution of the oxidant are advantageously contacted with one another inside the turbulence chambers of the spray nozzle.

The oxidant is preferably a solution of an alkali metal nitrate, alkali metal chlorate or a peroxide, which should be used at a temperature of less than 35° C.

As mentioned above, in the production of light polyphosphates, i.e., of products of low bulk density, it is possible to improve the effect produced by means of the low-valent phosphorus compounds by spraying the orthophosphate solution or suspension in contact with a further solution liberating $CO_2$ on being sprayed.

In accordance with the present invention odorless final products can even be obtained using gases, e.g., off-gases originating from the production of phosphorus and containing up to at most 2000 milligrams phosphorus per cubic meter, as the heating gas for the spray tower.

Phosphoric acids obtained by the so-called "wet" processing treatment from crude phosphates and sulfuric acid are generally found, unless pure apatite is used, to include a certain content of oxidizable impurities, particularly of organic nature. When this type of phosphoric acids is used for making alkali metal polyphosphates, the latter are found to contain various decomposition products which derive from those organic impurities and impair the whiteness of the polyphosphate. The whiteness of those products is generally distinctly inferior to that of salts produced from electrothermal phosphoric acid.

The present process has also unexpectedly been found to enable the production of very white polyphosphates even when the starting orthophosphate spray solutions are contaminated with organic compounds, such as found in solutions made from wet phosphoric acid. These organic contaminants may be present in a proportion of up to 3% by weight, preferably of up to 1% by weight, referred to $P_2O_5$.

Polyphosphates of low bulk density can also be prepared by the present invention from orthophosphate solutions contaminated with organic compounds while adding low-valent phosphorus compounds, because the organic compounds are oxidized not earlier than after decomposition of the low-valent phosphorus compounds, which are needed for the formation of light final products.

The starting materials suitable for use in the present process include orthophosphate solutions produced from so-called "wet" phosphoric acid alone or in admixture with electrothermal phosphoric acid, by neutralization so as to obtain the desired ratio of alkali metal oxide to $P_2O_5$.

The following examples which in part are examples of comparison illustrate the process of the present invention.

Example 1 (conventional process)

Phosphoric acid of about 80% strength with a content of low-valent P-compounds of 0.83% by weight (in the form of phosphite ions) was neutralized by means of a sodium hydroxide solution so as to obtain a molar ratio of $Na_2O:P_2O_5=5:3$. The solution which contained about 30% by weight $P_2O_5$ and had a temperature of about 90° C., was sprayed inside a spray tower in conventional manner by means of CO-gas free from phosphorus. The off-gas temperature was determined to be 350° C. The sodium tripolyphosphate so produced had a bulk density of 0.35 kg./liter. When moistened with or dissolved in water, the product was found to have an unpleasant smell of garlic. In the lead acetate test, a black spot was found which indicated the presence of reducing substances.

Example 2 (conventional process)

A spray solution similar to that described in Example 1 was used. The solution had been prepared from phosphoric acid of about 80% strength, but which contained no more than 0.44% by weight of low-valent phosphorus compounds (in the form of phosphite ions). The solution was sprayed through a nozzle at a rate of 6.5 cubic meters per hour together with 200 liters/hr. sodium carbonate solution (20% by weight $Na_2CO_3$). The spraying was achieved by means of CO-gas free from phosphorus. The $Na_2O$-proportion present in the salt solution had been taken into consideration in preparing the starting solution. The tripolyphosphate obtained had a bulk density of 0.35 kg./liter. The product was found in the lead acetate test also to contain reducing substance; the olfactory test indicated that the product was not quite satisfactory.

Example 3 (process of invention)

To a starting solution similar to that used in Example 1 there was added sodium nitrate in a proportion sufficient to produce a polyphosphate containing about 0.1% by weight $NaNO_3$. The starting solution so prepared was sprayed in conventional manner by means of CO-gas free from phosphorus. When dissolved in water, the product so made was found to be free from unpleasant smell and to produce no black spot in the lead acetate test. The product was, however, found to have a bulk density of 0.65 kg./liter. In other words, the effect of the low-valent phosphorus compounds added to produce low bulk density, had been annulled prematurely.

Example 4 (process of invention)

A starting solution was prepared in the manner set forth in Example 1 from phosphoric acid having a strength of about 80% and containing 0.83% by weight phosphite ions, and the solution was sprayed. The nozzle inside the spray tower was designed for spraying 6.5 cubic meters/hr. A solution of $NaNO_3$ in water was prepared in a separate vessel. The $NaNO_3$-solution, which had a temperature of 19° C. and contained 25 grams $NaNO_3$/liter, was so introduced by means of a pump into the nozzle of the spray tower that it contacted the orthophosphate solution not earlier than inside the turbulence chambers of the nozzle for a period of 0.1 second, after which the two solutions were sprayed jointly. The oxidizing solution was used at a rate of 200 liters/hr. CO-gas free from phosphorus was the heating gas. The tripolyphosphate so made had a bulk density of 0.35 kg./liter. It was free from annoying decomposition products originating from low-valent phosphorus compounds and, therefore odorless.

Example 5 (process of invention)

A starting solution was prepared in the manner set forth in Example 2 from phosphoric acid having a strength of about 80% and containing 0.44% by weight phosphate ions, and the solution was sprayed. The nozzle inside the spray tower was designed for spraying 6.5 cubic meters per hour. A further solution containing about 200 grams $Na_2CO_3$ in addition to 25 grams $NaNO_3$ per liter was prepared in a separate vessel. This second solution had a temperature of 29° C. and 200 liters/hr. were caused to flow into the nozzle of the spray tower. The oxidizing solution and the spray solution were allowed to contact each other inside the turbulence chambers of the nozzle for a period of 0.1 second. CO-gas free from phosphorus was used as the heating and spray gas. Tripolyphosphate having a bulk density of 0.35 kg./liter was obtained. When dissolved in water, the product was found to be free from unpleasant odor, and in the lead acetate test it was found to be absolutely neutral.

Example 6 (conventional process)

A starting solution with a molar ratio of $Na_2O:P_2O_5=5:3$ was prepared from phosphoric acid of about 80% strength and free from phosphite, and the solution was sprayed in conventional manner using phosphorus furnace gas containing 250 milligrams phosphorus per cubic meter as the spray gas. Polyphosphate having a bulk density of 0.65 kg./liter was obtained. When moistened with water, the product was found to have a strong unpleasant odor and to produce a black spot in the lead acetate test.

Example 7 (process of invention)

A starting solution was prepared in the manner set forth in Example 6 using phosphoric acid free from phosphite. A further solution containing about 25 grams $NaNO_3$/liter was prepared in a separate vessel. This second solution had a temperature of 19° C. 6.5 cubic meters/hr. orthophosphate solution and 250 liters/hr. oxidizing solution were introduced jointly into the nozzle of the spray tower and allowed to contact each other in the turbulence chambers of the nozzle for a period of about 0.1 second. The spray tower was heated by means of phosphorus furnace gas containing 250 milligrams phosphorus per cubic meter. The polyphosphate so made which had a bulk density of 0.65 kg./liter, was found to be free from unpleasant smell and to react absolutely negatively in the lead acetate test.

Example 8 (process of invention)

Light polyphosphate was prepared in the manner set forth in Example 4, save that phosphorus furnace gas containing about 250 milligrams phosphorus per cubic meter was the gas used for heating the spray tower, and that the oxidizing solution was used at a rate of 250 liters/hr. The product so made had a bulk density of 0.35 kg./liter. It was free from annoying decomposition products and therefore of unobjectionable quality.

Example 9 (process of invention)

Light polyphosphate was prepared in the manner set forth in Example 5, save that phosphorus furnace gas was used for heating the spray towers and that the oxidant was used at an increased rate of 250 liters/hr. sodium nitrate solution. The product so made had a bulk density of 0.35 kg./liter and an unobjectionable quality.

Example 10 (conventional process)

Phosphoric acid prepared from electrothermal phosphorus, so-called "thermal" phosphoric acid, was neutralized by means of sodium hydroxide solution to obtain a molar ratio of $Na_2O:P_2O_5=5:3$. The solution contained about 30% by weight $P_2O_5$ and had a temperature of about 90° C. It was sprayed in conventional fashion inside a spray tower, the off-gases leaving at a temperature of about 350° C. The resulting tripolyphosphate had a bulk density of 0.65 kg./liter; it was free from visible contaminants. The whiteness, compared with that of magnesium oxide for analyses, was found to be 96%.

Example 11 (conventional process)

Phosphoric acid prepared by wet processing treatment, so-called "wet" phosphoric acid, was neutralized by means of sodium hydroxide solution so as to obtain a molar ratio of $Na_2O:P_2O_5=5:3$. The solution contained about 28% by weight $P_2O_5$ and had a temperature of about 90° C. It was sprayed in conventional manner inside a spray tower; the off-gases had a temperature of about 350° C. The resulting tripolyphosphate had a bulk density of 0.60 kg./liter and was apparently not quite white. The whiteness, compared with that of magnesium oxide for analyses, was found to be less than 90%.

Example 12 (process of invention)

"Thermal" phosphoric acid was mixed with "wet" phosphoric acid in the ratio of 1:1. The acid mixture was neutralized by means of sodium hydroxide solution so as to produce a ratio of $Na_2O:P_2O_5=5:3$. The solution contained 29% by weight $P_2O_5$. A further solution containing 25 grams $NaNO_3$/liter was prepared in a separate vessel. The orthophosphate solution which had a temperature of 90° C. was sprayed at a rate of 6.5 cubic meters/hr. together with the nitrate solution which had a temperature of 19° C., through the nozzle inside the spray tower. The two solutions were allowed to contact each other in the turbulence chambers of the nozzle for a period of about 0.1 second, the off-gases leaving the spray tower at a temperature of 350° C. The resulting tripolyphosphate had a bulk density of 0.63 kg./liter. It was free from visible contaminants. The whiteness, compared with that of magnesium oxide for analyses, was found to be 96%.

Example 13 (process of invention)

A starting solution of "wet" phosphoric acid similar to that used in Example 11 was prepared for being sprayed. A further solution containing 25 grams $NaNO_3$ and having a temperature of 19° C. was prepared in a separate vessel. The orthophosphate solution was introduced at a rate of 6.5 cubic meters per hour jointly with 200 liters/hr. oxidizing solution into the spray nozzle so that the contact time in the turbulence chambers of the nozzle was about 0.1 second. The off-gas temperature inside the spray tower was 350° C. The resulting tripolyphosphate had a bulk density of 0.65 kg./liter; it was free from visible impurities. The whiteness, compared with that of magnesium oxide for analyses, was found to be 96%.

Example 14 (conventional process)

Thermal phosphoric acid free from phosphorous acid was mixed with "thermal" phosphoric acid containing 2.3% by weight $H_3PO_3$, i.e., with a proportion of that latter acid sufficient to obtain a mixture containing 0.80% by weight $H_3PO_3$. The acid mixture was neutralized by means of sodium hydroxide solution so as to obtain a molar ratio of $Na_2O:P_2O_5=5:3$. The solution contained about 30% by weight $P_2O_5$ and had a temperature of about 90° C. It was sprayed in conventional fashion inside a spray tower; the off-gas temperature was about 350° C. The resulting tripolyphosphate had a bulk density of 0.35 kg./liter; it was free from visible impurities. The whiteness, compared with that of magnesium oxide for analysis, was found to be 96%.

Example 15 (conventional process)

0.8% by weight low-valent phosphorus compounds, in the form of $H_3PO_3$, was added to phosphoric acid prepared by wet processing treatment. The acid was neutralized by means of sodium hydroxide solution so as to produce a ratio of $Na_2O:P_2O_5=5:3$. The solution which had a temperature of about 90° C. was sprayed in conventional manner; the off-gas temperature was about 350° C. The resulting tripolyphosphate had a bulk density of 0.35 kg./liter. It was apparently not quite white. The whiteness, compared with that of magnesium oxide for analyses, was found to be less than 90%.

Example 16 (process of invention)

0.8% by weight low-valent phosphorus compounds in the form of $H_3PO_3$ was added to "wet" phosphoric acid and the acid was neutralized by means of sodium hydroxide solution so as to obtain a ratio of $Na_2O:P_2O_5=5:3$. A solution of $NaNO_3$ in water was prepared in a separate vessel. It had a temperature of about 19° C. and contained 25 grams $NaNO_3$ per liter. The spray nozzle inside the spray tower was designed for spraying about 6.5 cubic meters orthophosphate solution per hour. The oxidizing solution was so introduced into the tower, at a rate of 200 liters/hr., that it contacted the orthophosphate solution not earlier than in the turbulence chambers of the nozzle, for a period of about 0.1 second; thereafter, the two solutions were sprayed jointly. The off-gas temperature was about 350° C. The tripolyphosphate so produced had a bulk density of 0.35 kg./liter and was free from visible impurities. The whiteness, compared with that of magnesium oxide for analyses, was found to be 96%.

We claim:

1. In a process for the manufacture of polyphosphates of low bulk density, by spraying an orthophosphate solution or suspension in the presence of low valent phosphorus reducing compounds consisting of phosphites, hypophosphites, phosphite esters or corresponding decomposition products thereof in a spray tower, the invention which comprises combining the orthophosphate solutions or suspensions and the reducing compounds with a solution of an oxidant for said reducing compounds inside the turbulent chambers of a spray nozzle for a period of less than 1 second duration, and thereafter spraying the combined materials jointly at temperatures between 200° and 500° C., thereby producing said polyphosphates devoid of unpleasant smell on being solubilized in water.

2. The process of claim 1, wherein the reducing substances are low-valent phosphorus compounds in which the phosphorus has an electropositive valency of less than 5.

3. The process of claim 1, wherein the orthophosphate solutions and suspensions, respectively, are contacted with the solution of the oxidant for a period of 0.1 to 0.3 second.

4. The process of claim 1, wherein the orthophosphate solutions and suspensions, respectively, are used while hot.

5. The process of claim 1, wherein the oxidant is a solution of at least one member selected from the group consisting of alkali metal nitrates, alkali metal chlorates and peroxides.

6. The process of claim 1, wherein the solution of the oxidant is used at a temperature of less than 35° C.

7. The process of claim 1, wherein the orthophosphate solutions and suspensions, respectively, are sprayed jointly with a solution liberating $CO_2$ on being sprayed, with the resultant formation of products of low bulk density.

8. The process of claim 1, wherein the spray tower is heated by means of a gas containing at most 2000 milligrams phosphorus per cubic meter.

9. The process of claim 8, wherein the spray tower heating gas is gas originating from phosphorus production.

10. The process of claim 1, wherein the orthophosphate solutions sprayed are contaminated with organic compounds.

11. The process of claim 10, wherein the orthophosphate solutions contain the organic contaminants in a proportion of up to 3% by weight, referred to $P_2O_5$.

12. The process of claim 11, wherein the orthophosphate solutions contain the organic contaminants in a proportion of less than 1% by weight, referred to $P_2O_5$.

References Cited

UNITED STATES PATENTS

| 2,898,189 | 8/1959 | Rodis et al. | 23—107 |
| 3,378,341 | 4/1968 | Hartlapp et al. | 23—107 |
| Re. 24,381 | 10/1957 | Pfrengle. | |
| 2,986,449 | 5/1961 | Rodis et al. | |

FOREIGN PATENTS 1,188,055            Germany.

EDWARD STERN, *Primary Examiner.*

U.S. Cl. X.R.

23—106, 107